July 28, 1925.
C. S. HALL
1,547,912
AIRCRAFT
Filed Jan. 26, 1925
3 Sheets-Sheet 1
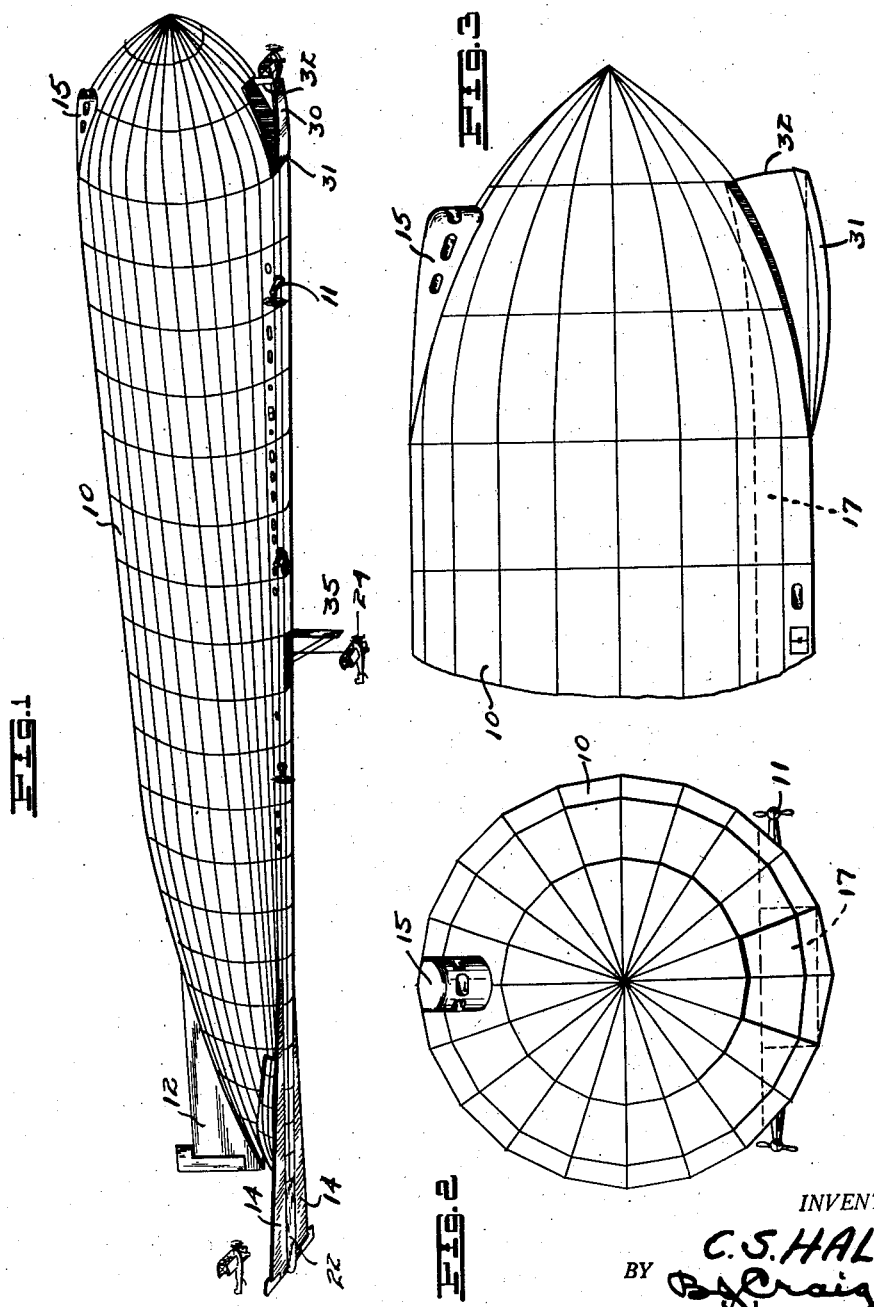
INVENTOR.
C. S. HALL.
BY
ATTORNEY July 28, 1925.
C. S. HALL
AIRCRAFT
Filed Jan. 26, 1925
1,547,912
3 Sheets-Sheet 2
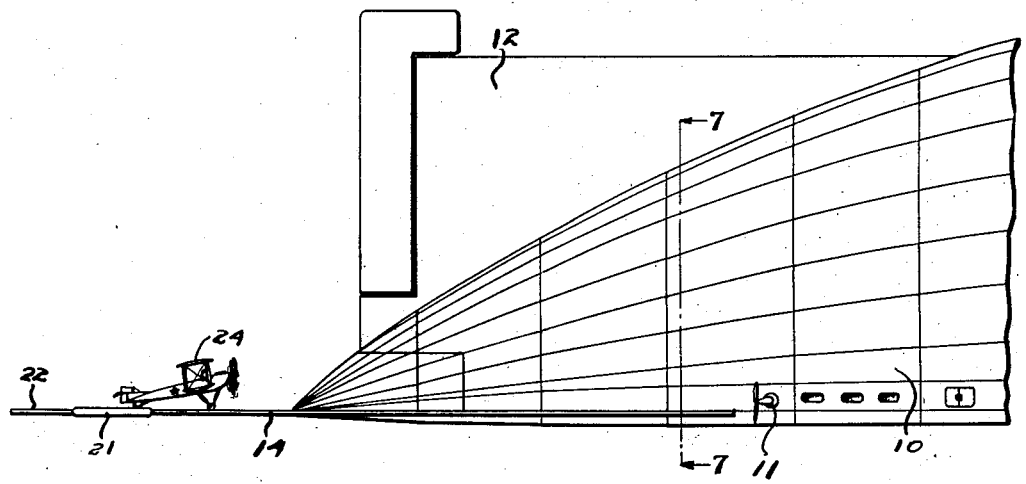
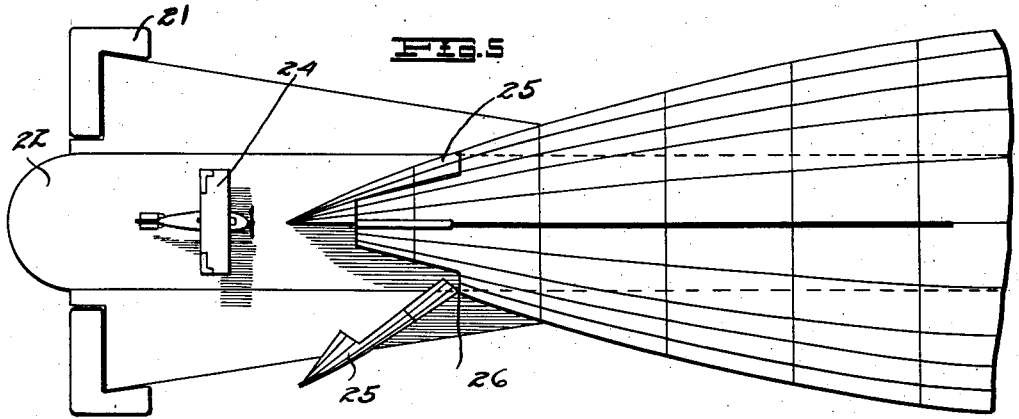
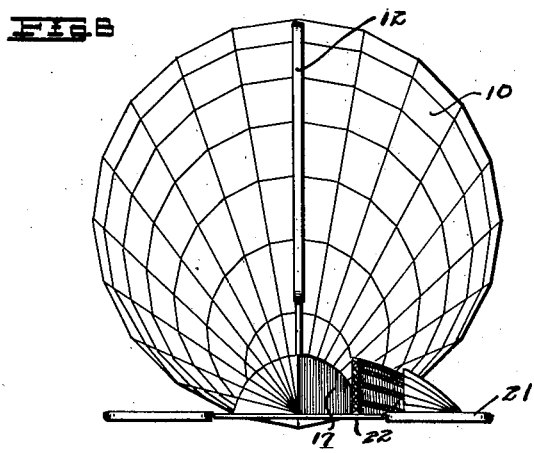
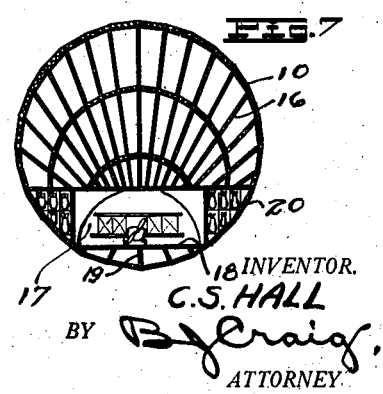
INVENTOR.
C. S. HALL
BY B. J. Craig,
ATTORNEY July 28, 1925.
C. S. HALL
AIRCRAFT
Filed Jan. 26, 1925     3 Sheets-Sheet 3
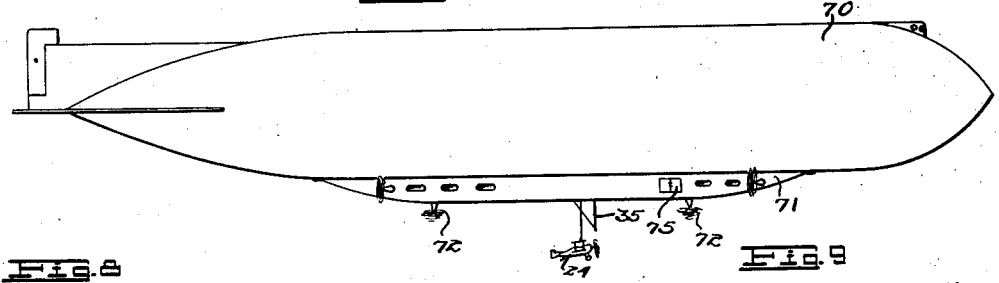
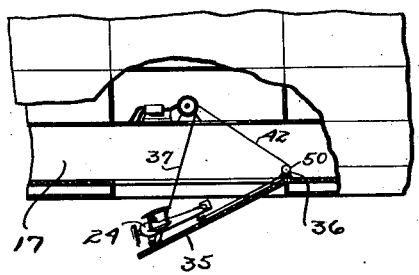
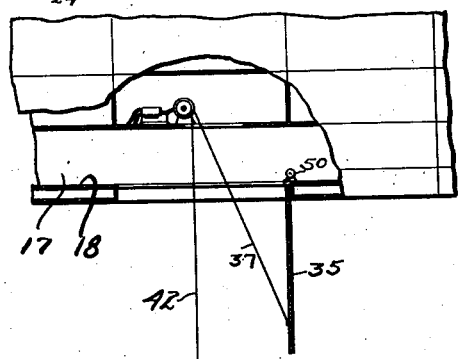
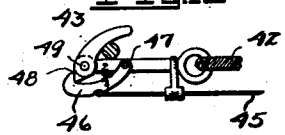
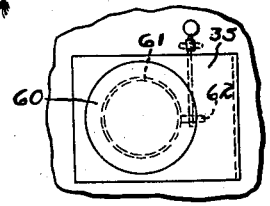
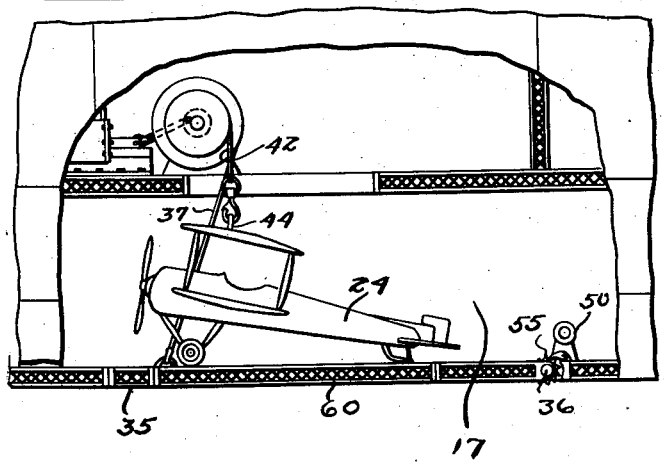
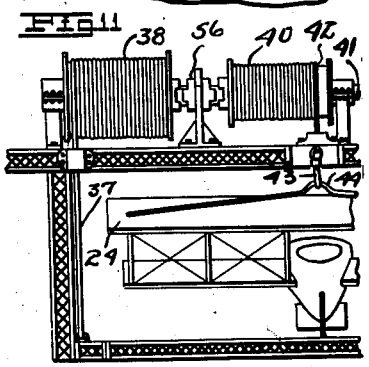
INVENTOR.
C.S. HALL
BY B.J.Craig
ATTORNEY.

Patented July 28, 1925.

1,547,912

UNITED STATES PATENT OFFICE.

CHARLES S. HALL, OF OAKLAND, CALIFORNIA.

AIRCRAFT.

Application filed January 26, 1925. Serial No. 4,697.

*To all whom it may concern:*

Be it known that I, CHARLES S. HALL, a citizen of the United States, residing at Oakland, in the county of Alameda and State of California, have invented a certain new and useful Improvement in Aircraft, of which the following is a full, clear, and exact description, reference being had to the accompanying drawings.

This invention relates to lighter-than-air aircraft.

The general object of the invention is to provide an improved type of aircraft which is constructed to receive and securely house a plurality of smaller aircraft therein and wherein means is provided for launching the contained aircraft when desired.

A further object of the invention is to provide an aircraft of the mother ship type wherein an airplane may be launched either from a position near the front of the ship or from beneath the ship.

Another object of the invention is to provide a mother aircraft wherein the storage space for the smaller craft is provided in the lower portion of the hull of the ship, the cylindrical form of which remains undisturbed.

An additional object of my invention is to provide an aircraft with a longitudinal passage extending therethrough and with a means for closing the front and rear ends of the passage.

A further object of the invention is to provide an aircraft wherein means is arranged for engaging an airplane while the aircraft is moving and for lifting the airplane into a storage space on the aircraft.

Another object of the invention is to provide a mother ship having a storage space for airplanes thereon, and having storage chambers for bombs adjacent an airplane storage space and wherein means is provided for landing airplanes from the mother ship.

A further object of the invention is to provide an aircraft wherein the vertical rudders are arranged to receive an airplane thereon and wherein a passage leads from said vertical rudders to the interior of the aircraft.

Another object of my invention is to provide an aircraft with a central airplane storage chamber wherein a stream line door is provided in the floor of said chamber so that airplanes may be dropped therefrom.

A further object of the invention is to provide an airplane of the mother ship type wherein a central storage space is provided and wherein a turn table is arranged to act in conjunction with discharge shoots enabling an airplane to be discharged from the mother ship either in the direction of the flight of the mother ship or in a reverse direction.

Other objects of the invention will be apparent from the following description taken in connection with the accompanying drawings wherein Fig. 1 is a perspective view of an aircraft embodying the features of my invention; Fig. 2 is a front elevation of the aircraft; Fig. 3 is a fragmentary side elevation showing the front portion of the aircraft; Fig. 4 is a view similar to Fig. 3 showing the rear portion of the aircraft; Fig. 5 is a top plan view of the rear portion of the aircraft; Fig. 6 is a rear elevation of the aircraft; Fig. 7 is a transverse section on line 7—7, Fig. 4; Fig. 8 is a fragmentary elevation partly in section showing the means for handling airplanes; Fig. 9 is a view similar to Fig. 8 showing the parts in another position; Fig. 10 is a view similar to Fig. 8 on an enlarged scale showing the door closed; Fig. 11 is an elevation of the mechanism for handling airplanes; Fig. 12 is a plan view of a turntable; Fig. 13 is a detailed view of the disengaging hook; and Fig. 14 is a side elevation of a modification of my invention.

Referring to the drawing by reference characters, I have shown an aircraft embodying the features of my invention at 10. This aircraft is indicated as provided with propellers 11, vertical stabilizing fins 12, horizontal stabilizing fins 14 and a bridge 15.

The aircraft 10 is of the mother ship type wherein the aircraft is adapted to house and furnish supplies for a plurality of heavier-than-air flying machines. The mother ship is constructed to provide a storage chamber for a plurality of the airplanes and also to provide means for bringing the airplanes into this storage chamber and for discharging them from the mother ship while the mother ship is in flight.

Referring to the cross sectional view in Fig. 7 it will be noted that the aircraft is provided with sustaining frame work 16 and with a chamber 17 adjacent the bottom of the frame. It is desirable that the stream line of the mother ship be maintained and in order to do this and at the same time to provide a substantially level place for storage and movement of the airplanes, I show the passage 17 as provided with a runway 18 beneath which suitable supporting struts 19 may be arranged if desired.

At the center of the aircraft, adjacent to a turntable to be presently described, I arrange bomb racks as shown at 20 in Fig. 7 for the reception of bombs and aerial torpedoes which may be supplied to the airplanes housed within the mother ship.

The stabilizing fin 14 intermediate the vertical rudder 21 is provided with a runway 22 which is a continuation of the runway 18. Upon this runway 22 airplanes 24 may land. Since the mother ship will be in motion when the airplanes land upon the runway 22 and since the airplanes 24 will be moving at substantially the speed of the mother ship, the landing of airplanes can be very easily brought about without danger of wrecking it or the mother ship.

In order to afford an entrance for the airplane and at the same time in order to preserve the stream line effect of the rear end of the mother ship 10, I provide a stream line door at 25. This door is shown as composed of two members which are hinged at 26 to turn about a vertical pivot.

In operation when the airplane 24 is about to land upon the runway 22 the doors 25 will be opened and after the airplane 24 is landed the doors 25 will be closed to reduce wind resistance.

The propellers 11 are preferably of the shiftable type so that they can produce a longitudinal thrust or a vertical thrust. I prefer when an airplane is landing on the runway 22 to have some of these propellers 11 directed to produce an upward impulse to counteract the downward thrust brought about by the added weight of the airplanes on the frame of the mother ship.

Airplanes may be discharged from the mother ship along the runway 22 and they may also be discharged forwardly from the mother ship as shown in Fig. 1. To allow this method of discharge I show the front of the aircraft as provided with a door 30 which is hinged at 31 to the aircraft. This door may be operated by means of cables 32 to open and close it. The door 30 as shown is of stream line form so that when the door is closed the surface of the aircraft will be uninterrupted.

The doors already described as well as the other operating mechanism to be presently described may be operated from the bridge 15 or the mechanism may be operated by controls placed at the different positions or by both methods.

Instead of discharging the airplanes from the front or rear of the mother ship, I may provide a door 35 which may be hinged as at 36 intermediate the length of the aircraft 10. This door is adapted to be turned on a hinge 36 and the movement is controlled by means of a cable 37 which passes over the drum 38. Suitable power means may operate the drum 38 and a suitable brake mechanism, not shown but which is well known in the art, may be used for controlling the drum 38.

In order to hold the airplane 24 in position ready to be discharged upon the runway 35 I show a second drum 40 mounted on the shaft 41 on which the drum 38 is mounted.

The drum 40 receives a cable 42 which has a hook 43 at one end thereof. This hook 43 may engage a member 44 upon the top of the airplane 24. When the airplane is to be discharged from the door 35 as shown in Fig. 8, the cable 42 will be hooked into the rear portion of the airplane by means of the hook 43. When the pilot of the airplane 24 is ready the rope 45 will be pulled thus locking the arm 46 about its pivot 47 and releasing the engagement at 48 so that the hook 43 is free to turn about its pivot 49. This will allow the airplane 24 to drop from the door 35 after which the cable 37 may be elevated to raise the door. In this arrangement the cable 42 passes over a pulley 50 as shown in Fig. 8 so that the pull of the cable 42 will not disturb the balance of the airplane 24 on the door 35.

When desired the cable 42 may be withdrawn from the drum 50 and allowed to hang pendant as shown at 49. When in this position the hook 43 may be hooked on to an airplane flying beneath the mother ship 10. After this engagement is effected the cable 42 will be wound on the drum 40 to thus pull the airplane within the compartment 17. After the airplane has been thus pulled into the compartment the door 35 may be closed and may be secured in closed position by means such as a ratchet 55 shown in Fig. 10.

In order to afford a control for the drums 38 and 40 I may provide suitable clutches 56 as shown in Fig. 11.

In order that the airplanes may be faced about in the proper direction after they have been brought into the chamber 17 I provide the door 35 with a turntable 60. This turntable which is shown in plan in Fig. 12 may be circular in form and may be provided with a worm 61 which may be operated through a worm wheel 62, shown in dotted lines in Fig. 12.

I have shown my invention as embodied in a specially designed dirigible although it may be understood that it may be constructed as a device to be added to the type of dirigible in common use, as shown at 70. When this type of dirigible is used, instead of the longitudinal passage I may provide a removable hollow compartment 71 which may be secured beneath the aircraft 70 by bolts or other devices. Since this added portion provides more weight for the aircraft in some cases I may find it desirable to provide propellers 72 which are designed to exert a downward force when desired, to thereby compensate for the weight added to the aircraft 70. The compartment 71 may be provided with a trap door 35 and with means for operating this door with a cable and for hooking on to an airplane and for lifting an airplane into the compartment and discharging airplanes all in the manner previously described. In addition, the compartments 71 may be provided with doors 75 to afford access thereto.

From the foregoing description it will be apparent that I have provided an improved aircraft which can be readily manufactured and which will be highly efficient in use.

Having thus described my invention, I claim:

1. In an aircraft, a gas container, propellers arranged to drive said aircraft, vertical and horizontal stabilizing fins on said aircraft, said horizontal fins having a runway for airplanes thereon.

2. In an aircraft, the combination of, a gas container, means to drive said aircraft and a runway for airplanes supported by said container, said aircraft having a chamber therein, said chamber communicating with said runway and means to close communication between said chamber and said runway.

3. In an aircraft, the combination of, a gas container, propellers arranged to drive said aircraft, vertical and horizontal stabilizing fins on said aircraft, and a runway for airplanes on said horizontal stabilizing fins, said aircraft having a hollow chamber therein, said runway communicating with said chamber.

4. In an aircraft, the combination of, an outer body, a gas container, propellers arranged to drive said aircraft, vertical and horizontal stabilizing fins on said aircraft, an interior chamber extending substantially the full length of the aircraft, and means to close the front and rear end of said chamber, said means being stream line and coacting with said outer body so that an undisturbed contour of the body is provided.

5. In an aircraft, a gas container, propelling means on said container, said aircraft being substantially circular in cross section, said aircraft having a longitudinally extending chamber therein, said chamber extending from a point adjacent the nose of said aircraft to a point adjacent the tail thereof, doors for closing each end of said chamber, said chamber having airplane supporting means therein, said doors being stream line when closed.

6. In an aircraft, the combination of, a gas container, propelling means supported by said container, said aircraft having a longitudinally extending chamber therein, said chamber extending from a point adjacent the front of said aircraft to a point adjacent the tail thereof, doors for closing each end of said chamber, said doors being stream line when closed, the front door being mounted to swing about a horizontal pivot, means to lower said door whereby it may serve as a chute for airplanes, said rear door being made of two parts hinged about a vertical axis.

7. In an aircraft, a gas container, propelling means on said aircraft, an airplane storage chamber in said aircraft, said chamber extending longitudinally of said aircraft, a doorway in said chamber, a door for closing said doorway and means for supporting an airplane beneath said doorway.

8. In an aircraft, a gas container, propelling means on said aircraft, an airplane storage chamber in said aircraft, a doorway in said chamber, a door for said doorway, means for operating said door, a supplemental cable adapted to engage an airplane and means to wind up said cable to draw an airplane into said chamber.

9. In an aircraft, a gas container, propelling means on said aircraft, a chamber in said aircraft, a bottom door in said chamber, said door being hinged about a horizontal axis, means for supporting said door and for operating the same, and a supplemental means to support an airplane on said door.

10. In an aircraft the combination of a gas container, propelling means on said container, a horizontal fin on said aircraft, said aircraft being substantially circular in cross section, said aircraft having a longitudinally extending chamber therein, said chamber extending from a point adjacent the front of said aircraft to a point adjacent the tail thereof, doors for closing each end of said chamber, said doors being stream-line when closed, the front door being mounted to swing about a horizontal pivot, means to lower said door whereby it may serve as a chute for airplanes, said rear door being hinged and a runway for airplanes on said fin, said runway communicating with said chamber.

11. In an aircraft, a body portion having a plurality of propellers thereon, a chamber for stowing an airplane in said aircraft, a door leading to said chamber, a cable adapted to be depended from said aircraft, a hook on said table adapted to engage an aircraft, means to wind up said cable to draw said airplane into said chamber and means to close said door when the airplane is in said chamber.

12. In an aircraft, an elongated body portion substantially circular in cross section, means to propel said body, gas containers in said body, a storage space adjacent the lower portion of said body, said storage space being adapted to receive an airplane, a closure for the entrance to said storage space, a supplemental chamber adjacent said first chamber, said supplemental chamber having bomb racks therein.

13. In an aircraft, a body portion having a plurality of propellers thereon, a chamber in said aircraft for housing an aircraft, a door leading to said chamber, a cable adapted to be depended from said aircraft, a hook on said cable adapted to engage an aircraft, means to wind up said cable to draw said airplane into said chamber, means to close said door when the airplane is in said chamber, and means to discharge said airplane from said aircraft.

14. In an aircraft, the combination of, a gas container, propellers arranged to drive said aircraft, said aircraft having a chamber therein, a closure at each end of said chamber, said chamber being located adjacent to the lower portion of said aircraft, a trap door adjacent the intermediate portion of said chamber, said trap door affording an exit for releasing airplanes.

15. In an aircraft, a body portion having a plurality of propellers thereon, a chamber for stowing an airplane in said aircraft, a door leading to said chamber, a cable adapted to be depended from said aircraft, a hook on said cable adapted to engage an aircraft, means to wind up said cable to draw said airplane into said chamber, means to close said door when the airplane is in said chamber, means to lower said door, means to support an airplane in launching position on said door and means for releasing the airplane.

16. In an aircraft, the combination of, a gas container, propellers arranged to drive said aircraft, vertical and horizontal stabilizing fins on said aircraft, said horizontal fins having a runway for airplanes thereon, said aircraft having a chamber in the bottom thereof, said aircraft having doors thereon adjacent the rear end thereof closing communication between said runway and said chamber, said chamber extending substantially the full length of said aircraft, and closure means arranged adjacent the front end of the aircraft to close the front of said chamber.

17. In an aircraft, the combination of, a gas container, propellers arranged to drive said aircraft, vertical and horizontal stabilizing fins on said aircraft, said horizontal fin having a runway for airplanes thereon, said aircraft having a hollow chamber therein communicating with said runway, said aircraft having doors thereon adjacent each rear end thereof closing communication between said runway and said chamber, said passage extending substantially the full length of said aircraft, a trap door adjacent the intermediate portion of said chamber, said trap door affording an exit for releasing airplanes and means to hold an airplane adjacent to said trap door.

18. In an aircraft, the combination of, a gas container, propellers arranged to drive said aircraft, vertical and horizontal stabilizing fins on said aircraft, said horizontal fins having a runway for airplanes thereon, said aircraft having a hollow chamber in the bottom thereof, said chamber communicating with said runway, said aircraft having a door thereon adjacent the rear end thereof, said passage extending substantially the full length of said aircraft, a hinged door leading from said passage to the exterior of said aircraft, said last mentioned door being arranged adjacent the front end of the aircraft and means to lower and raise said door, said door being stream-line when closed, a trap door adjacent an intermediate portion of said chamber, said trap door affording means for releasing airplanes, a drum adjacent said trap door and means on said drum for supporting airplanes.

In testimony whereof I hereunto affix my signature.

CHARLES S. HALL.